Jan. 31, 1950     E. R. LOCHMAN     2,496,169
VARIABLE PITCH PROPELLER
Original Filed Aug. 8, 1942     6 Sheets-Sheet 1
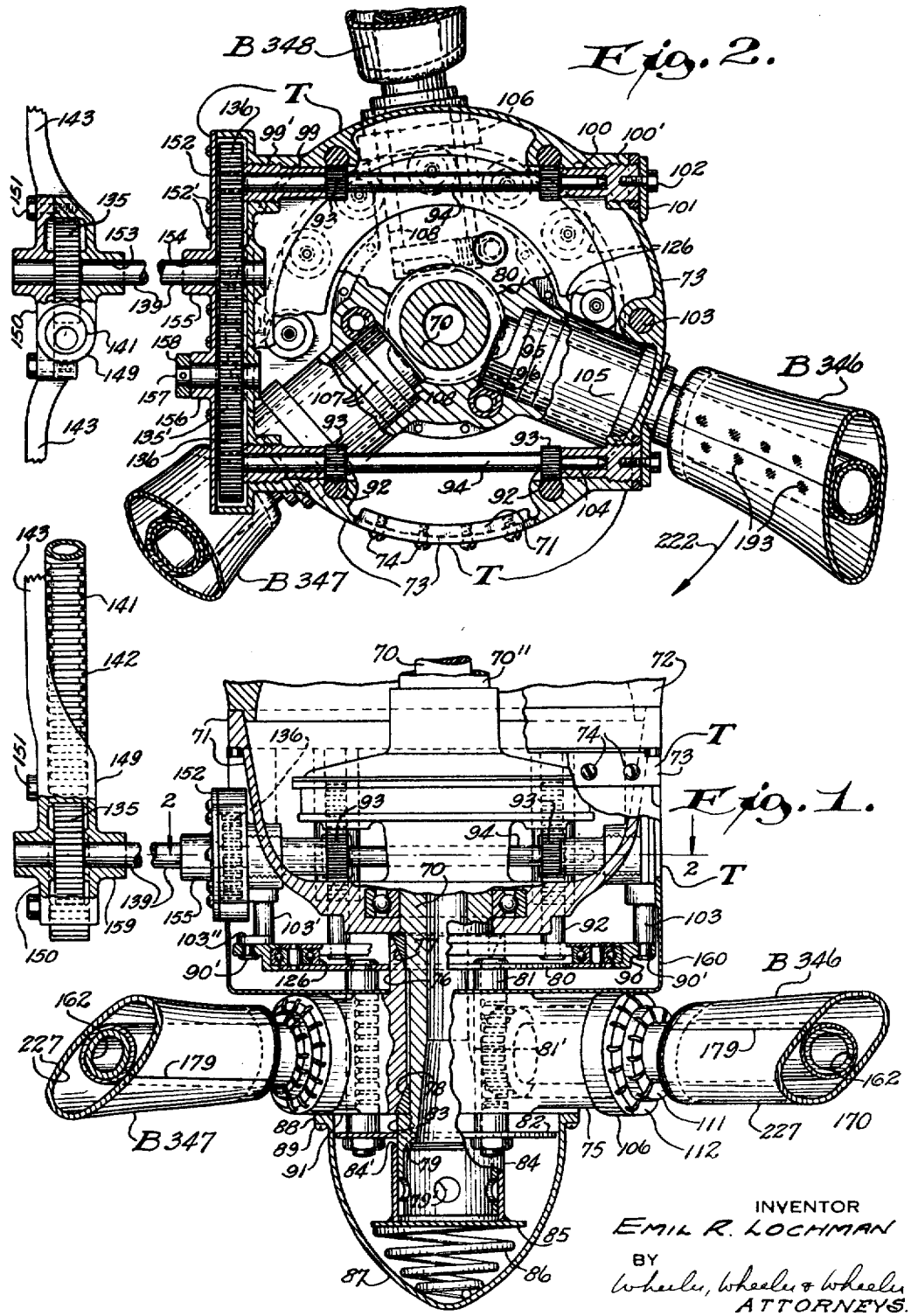
INVENTOR
EMIL R. LOCHMAN
BY
Wheeler, Wheeler & Wheeler
ATTORNEYS.

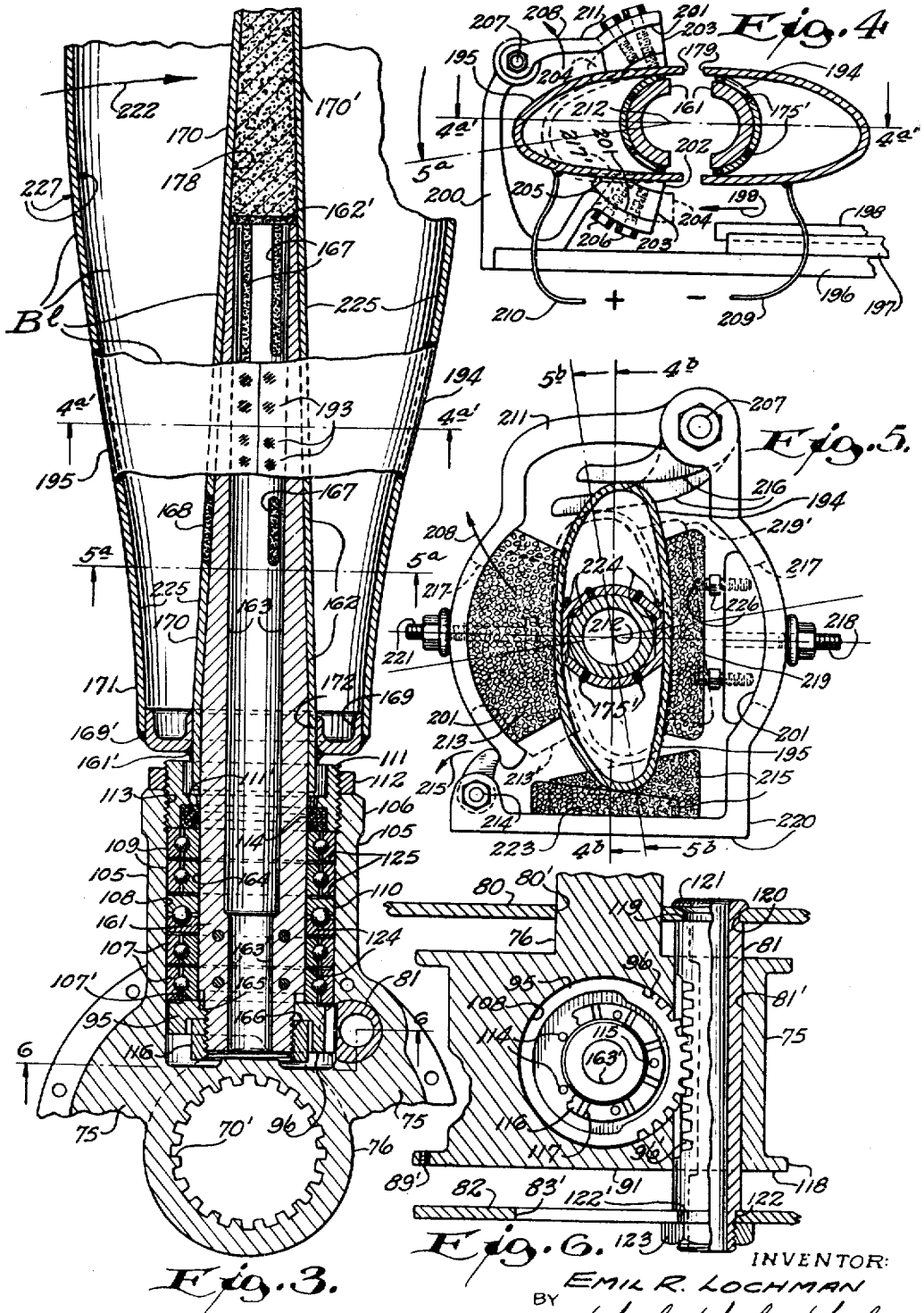

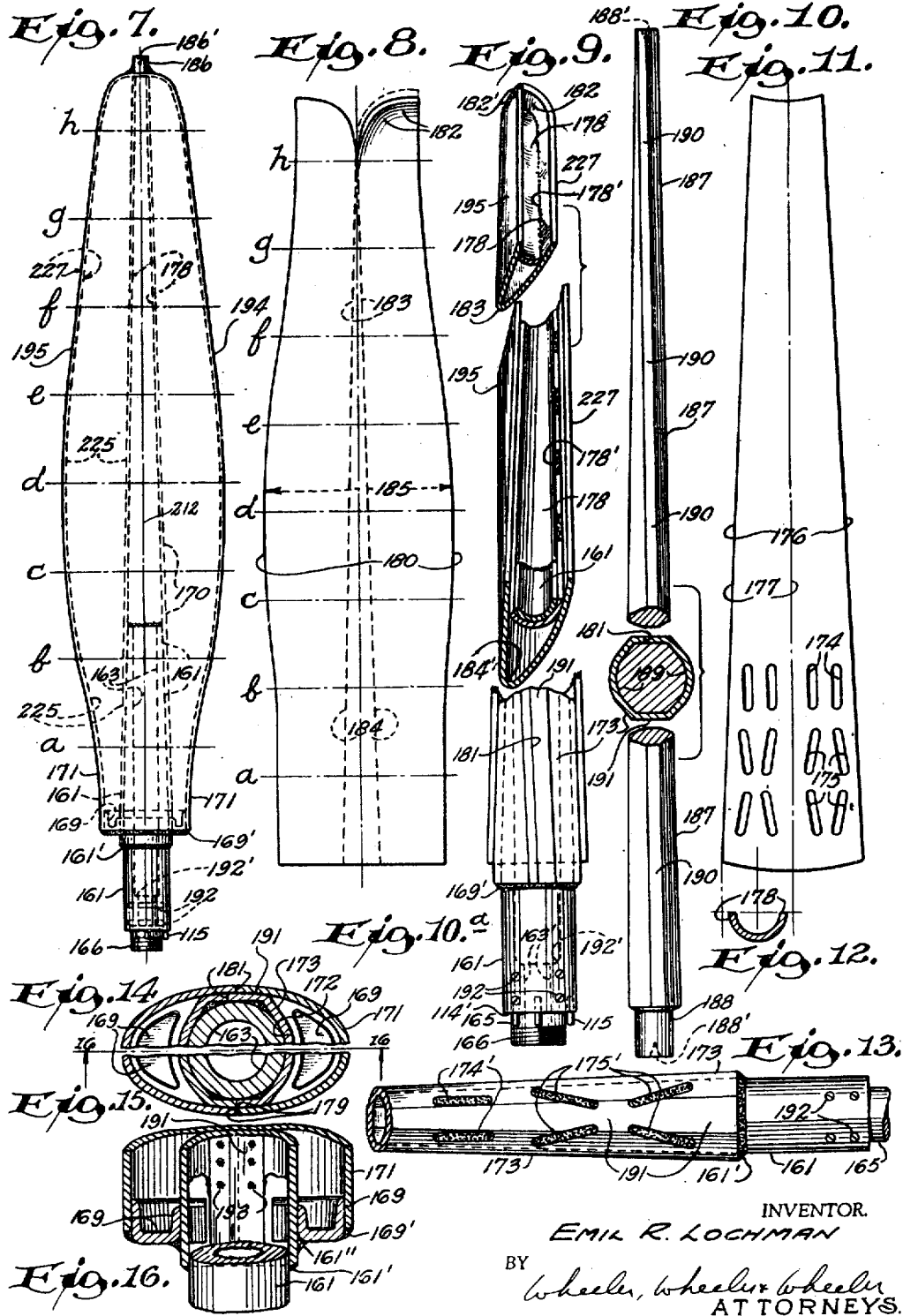

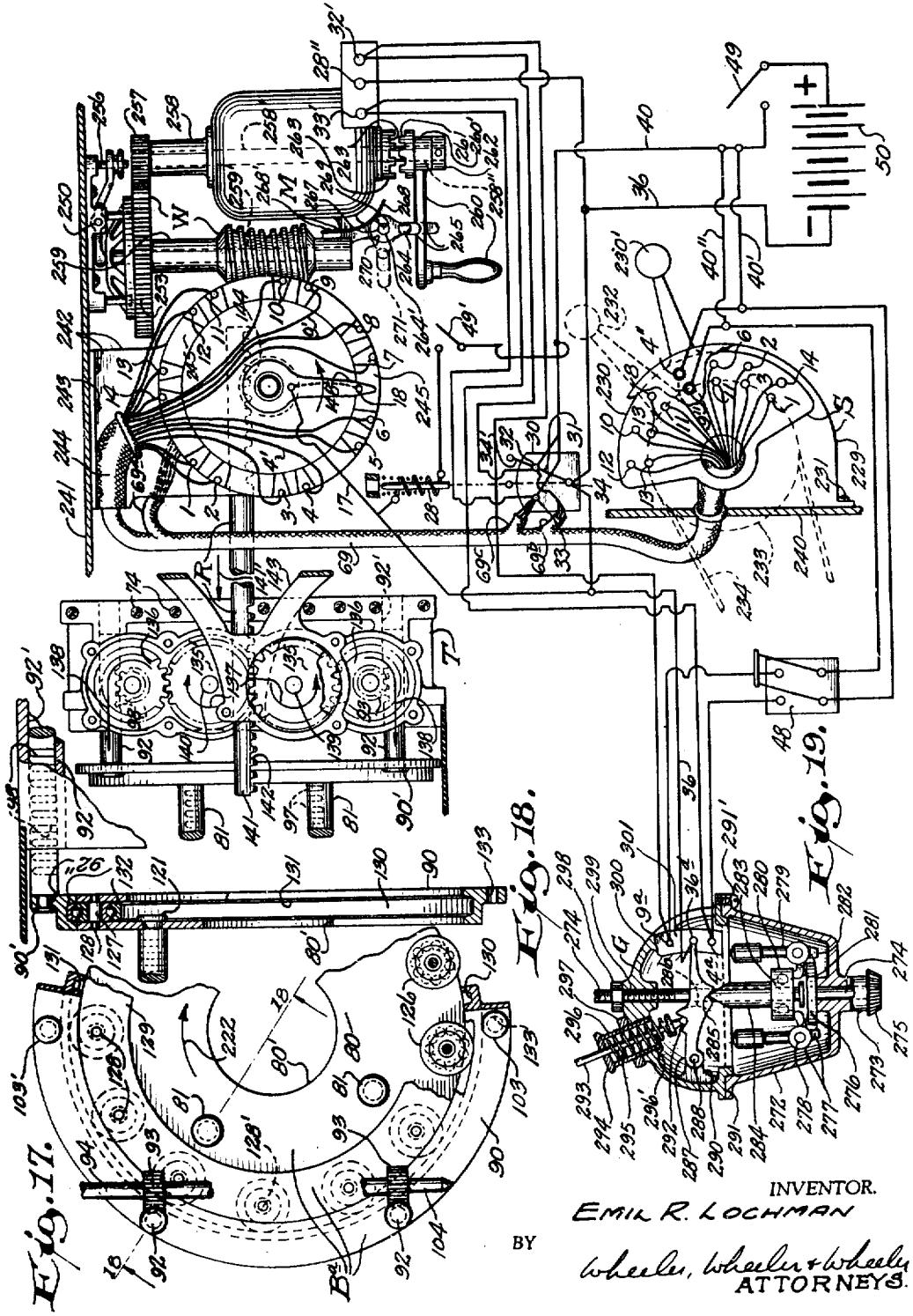

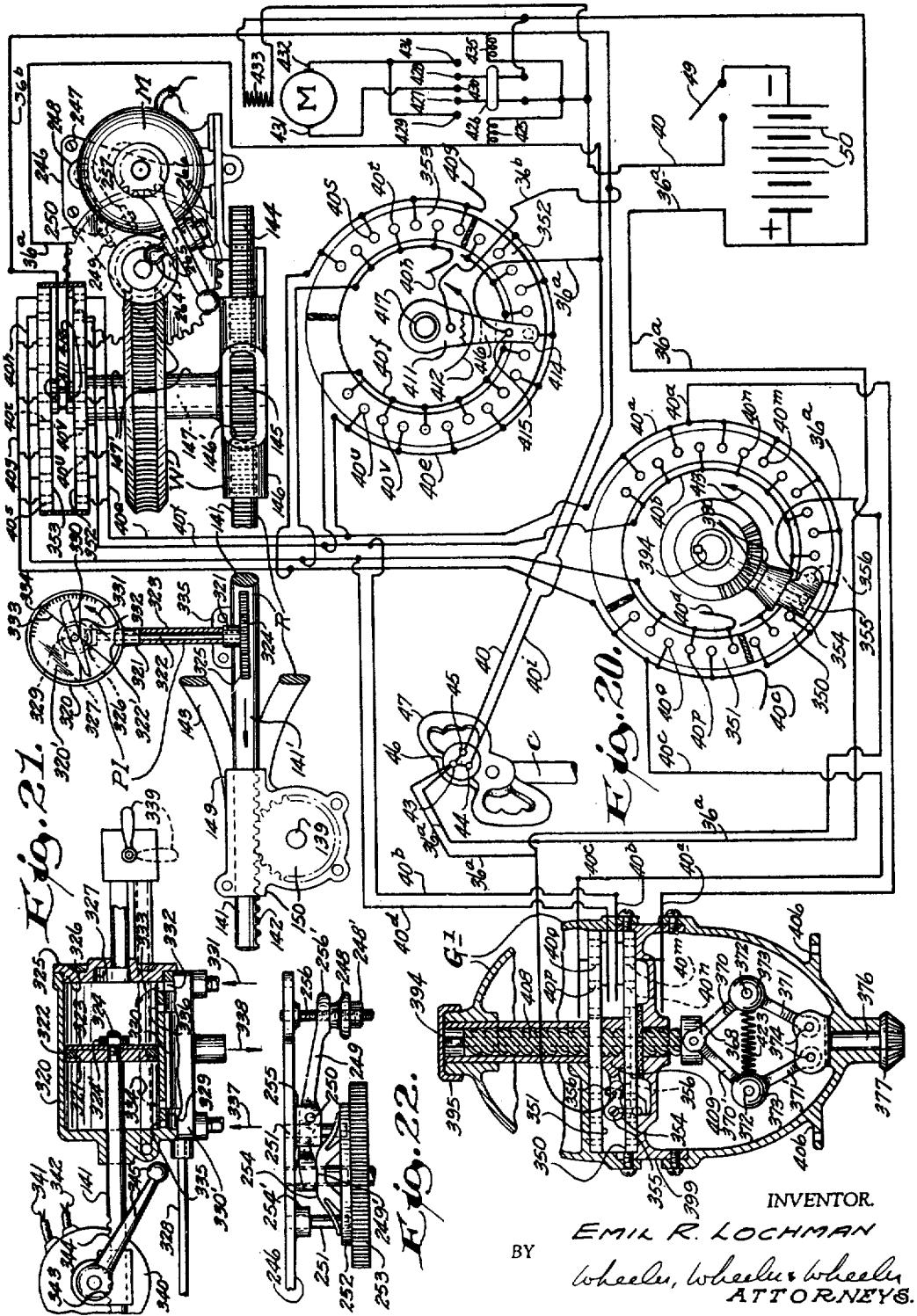

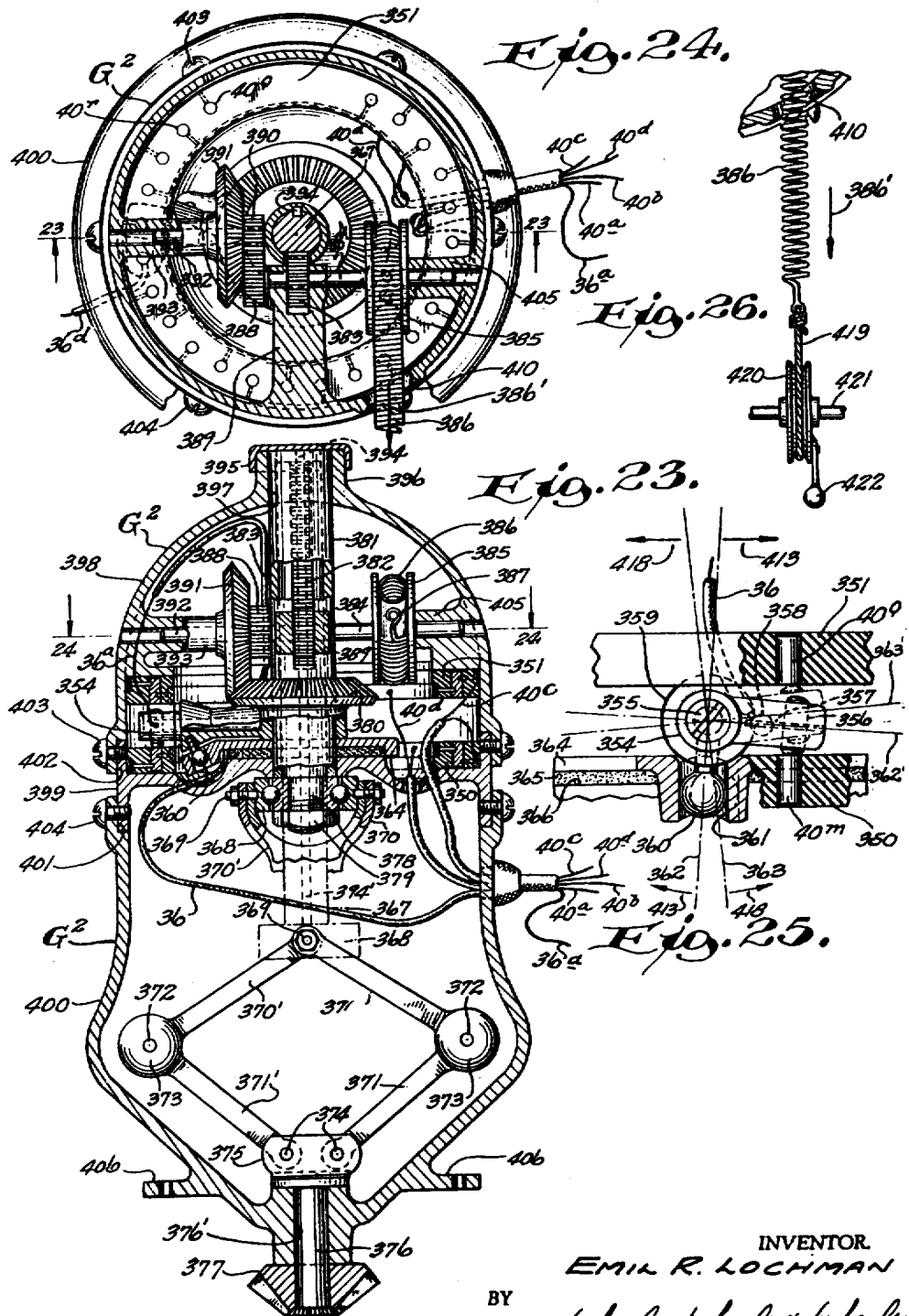

Patented Jan. 31, 1950

2,496,169

UNITED STATES PATENT OFFICE 2,496,169

VARIABLE PITCH PROPELLER

Emil R. Lochman, Milwaukee, Wis.

Original application August 8, 1942, Serial No. 454,146. Divided and this application August 24, 1944, Serial No. 550,924

6 Claims. (Cl. 170—160.43)

This invention relates to propellers and methods of propeller manufacture, and more particularly to a controllable pitch propeller for varying and controlling the pitch of the propeller in accordance with the operating conditions.

The principal object of this invention is to provide a simplified construction of a controllable pitch propeller, adapted for mass production, and adapted to be used and mounted on the engine shafts of the present day airplane engines, for immediate production.

A further object of the present invention is to reduce the number of operating parts, to avoid parts requiring very costly machining operations.

It is a further object of the present invention to provide a system for varying the pitch of a propeller which may be operated automatically at constant speed by a speed responsive governor coacting with an automatic switching device directly controlling the device for feathering the propeller blades.

A further object of this invention is to provide a system for varying the pitch of the propeller permitting a wide variation of adjustment of said pitch by selection of the operator and in co-action with the automatic control, and further permitting adaptation for various makes and sizes of airplanes and usable as a master control for a series of engines and propellers, as well as a single engine propeller control.

While any type of blade may be used in the feathering hub construction disclosed herein, it is a further object of this invention to improve propeller construction by strong internal reenforcements of a hollow blade and by changing the shape of the blade to avoid extreme forming strains and by providing a method of forming the blade in two halves and leaving a hollow passage from the root to the tip of the blade in the form of a combination spar for the purpose of aiding in the construction of the blade as well as increasing its strength, rigidity and thrust capacity.

A considerable number of accidents have occurred traceable to power-failures and consequent failure of the blade pitch controlling apparatus, especially through lack of pressure in the fluid system of the control. In addition, the oil becomes cold and sluggish in the extreme cold of high altitudes. These power-failures for the control system of the propellers increase greatly during actual fighting conditions in war service. It is therefore of great importance that a manual safety control be provided. In addition, my invention provides for constantly locking the pitch of the blades and rendering their actuating connections irreversible whether adjustment is effected by automatic control, by semi-automatic control, or by hand.

The manual or hand control further provides ready means for testing the pitching mechanism at any time without power application. This is of considerable assistance in ground testing.

This is a division of my co-pending application, Serial No. 454,146, filed August 8, 1942, and discloses unclaimed subject matter disclosed and claimed in my co-pending application Serial No. 130,918, filed December 3, 1949.

Further objects of the invention will appear in the following disclosure. The means by which the objects of the invention are obtained are more fully described with reference to the drawings, in which:

Figure 1 is a top plan view of the propeller assembly, with parts broken away to show part of the hub section and other operating parts in cross section, as well as showing the nose section of the airplane engine and the manner in which the propeller is attached thereto.

Figure 2 is a rear elevation of the propeller assembly, with parts cut away showing a cross section of the operating parts on line 2—2 of Figure 1, but omitting the nose section of the airplane engine, while the propeller hub has parts broken away to show a part in cross section.

Figure 3 is a fragmentary view of a single blade assembly in its respective hub socket, showing in radial section the respective operating parts and certain welding joints, a part of the blade appearing in elevation.

Figure 4 is a side view of the essential parts of an arc welding device showing two halves of a propeller in cross section as prepared for arc welding according to the process herein disclosed.

Figure 5 is a side view of a jig showing the cross section of a propeller prepared for brazing in a brazing furnace.

Figure 6 is a fragmentary cross sectional view of a hub assembly on line 6—6 of Figure 3, showing the rack and pinion control of a propeller blade.

Figure 7 is a front elevation of a propeller blade showing the essential parts of the construction, including the core shaft and the connecting internal spar.

Figure 8 is a plan view of the blank for forming a half section of a propeller blade.

Figure 9 is a perspective cross sectional view of propeller sections showing the internal spar in half section as prepared for arc welding the half blades shown in Figure 4.

Figure 10 is a plan view of a core die for forming the spar with a surface for attaching the blade sections according and conforming to the pitch of the blade.

Figure 10a is a fragmentary elevation of the bottom section of the core shaft showing the spar and a half section of the blade attached thereto.

Figure 11 is a plan view of the spar blank, showing welding slots.

Figure 12 is a cross section of a half spar prepared from a half section of said spar blank for use as shown in Figure 9.

Figure 13 is a plan view of the bottom section of the core shaft showing the bottom section of the spar welded thereto.

Figure 14 is a fragmentary cross section of the root of the blade showing the relative parts of the core shaft, spar and blade section welded and brazed together.

Figure 15 is a fragmentary cross sectional view of the same parts as arranged for arc welding.

Figure 16 is a cross section on line 16—16 of Figure 13, with parts broken away showing the position for the end fillers, welded in place to close and finish the bottom of the blade, also showing spot welding for rigidly connecting the spare to the blade.

Figure 17 is a fragmentary rear elevation of a large composite ball bearing for transmitting motion between two sets of rack and pinion transmissions for feathering the propeller blades.

Figure 18 is a cross section on line 18—18 of Figure 17.

Figure 19 is a diagrammatic plan view of the various apparatus for controlling the pitch of the propeller blades, including a wiring diagram connecting said relative parts for hand as well as automatic feathering of the propeller blades.

Figure 20 is a wiring diagram schematically illustrating partially in side elevation and partially in vertical section the parts shown in plan in Figure 19, and further illustrating the wiring connections to such parts, two of the switches shown in side elevation being also illustrated in plan.

Figure 21 is a view partially in side elevation and partially in section, showing an alternatively usable fluid motor attached to the rack bar to actuate the feathering mechanism.

Figure 22 is a view in side elevation of a friction brake, coupled to the motor operated worm drive to prevent overrun in the feathering of the propeller blades.

Figure 23 is an enlarged detail view of the governor in cross section on the line 23—23 of Figure 24.

Figure 24 is a fragmentary view of the governor in horizontal section on the line 24—24 of Figure 23.

Figure 25 is an enlarged detail view, partially in side elevation and partially in section, of the governor operated control switch mechanism.

Figure 26 is a fragmentary detail view of an adjustable governor spring anchorage, a portion of the governor casing being illustrated in section.

It will of course be understood that the description and drawings are merely illustrative of the present preferred form of application, and that various changes and modifications may be made in the structure disclosed without departing from the spirit of the invention, especially in fitting it to various types of airplanes and for their varying requirements and services.

Several of the features of my invention are usable independently of each other and in various combinations, being separately described and claimed. I shall hereinafter summarize these features and their properties.

For assistance in analyzing my disclosure, I may state that the complete apparatus hereinafter to be described includes:

1. A variable pitch propeller having important features of hub design, irrespective of the particular blades used therein.

2. A novel and improved propeller blade structure and process of manufacture which is particularly adapted for a variable pitch propeller, but may be used in any propeller of variable pitch or otherwise, and irrespective of the particular hub or pitch varying mechanism.

3. A novel pitch varying mechanism usable irrespective of specific blade or hub design and having peculiar advantages in the way of isolating control parts from the nose of the plane, and further advantages in that it is aprlicable to existing planes in the limited space available in such planes.

4. A variety of electrical controls for effecting the movement of pitch adjusting mechanisms, irrespective (at least to some extent) of the particular mechanisms or propellers involved, such controls providing for manual and automatic pitch adjustment, and providing for limitation of the automatic pitch adjustment either to particularly determined increments of advance in a given operation or to a particular overall range of movement, subject to regulation by the operator.

5. The invention comprehends the use in any adjustable blade propeller organization of an indicator which will visually show at all times to the pilot the exact pitch adjustment of his blades.

6. The invention provides means whereby, irrespective of the source of power for normal propeller blade pitch adjustment, the adjustment may be effected manually in the event of power failure.

7. The invention contemplates specific improvements in various pieces of apparatus, with particular reference to the governors and switches used in the system and the circuits employed therein.

Reference will first be made to Figures 1 and 2, where I have illustrated the:

*Propeller assembly.*—The propeller assembly comprises a hub 15 mounted upon and driven by a propeller shaft 10, which, in some installations, may also comprise the engine shaft, but which, in the device as illustrated, is driven at a reduced speed from the engine shaft 10' through conventional reducing gearing (not specifically illustrated), housed in the casing which is shown in plan in Figure 1 surrounding the engine shaft 10' and the propeller shaft 10.

The propeller shaft projects, in a conventional installation, from the nose housing member 71 of the plane, such member being bowl-shaped. On the projecting portion of the propeller shaft, is splined, the hub 75, having complementary splines 70', is mounted and positioned between taper collars 77 and 78 which are drawn snugly into the hub by the nut 79 secured to the end of the propeller shaft.

The taper collar 77 is engaged by the tubular rearward extension 76 of the hub proper, along which the actuating disk for feathering the blades of the propeller is slidably movable as will hereinafter be explained.

The one-piece plain hub 75 of suitable steel has three radial blade sockets 105 with plain bores 108 for controllably mounting the three propeller blades B346, B347 and B348. Each blade has a hollow core shaft 162 (see Figure 3) with a finished root section 161 on which I mount in series the nut 111 with its locknut 112; a set of felt washers 114 which are pressed into the recess 111' of nut 111 forming a grease seal; a set of radial ball bearings 109 with their outer races separated by washers 125; a heavy thrust bearing 110; an additional set of radial ball bearings 107 separated at their inner races by washers 124 (thereby transferring the very severe end thrust to the raised section 107' of said pinion 95) and, finally, a pinion 95.

The several parts described as mounted in series on the root section 161 of the propeller core shaft are held thereon by the nut 116 screwed to the inner end of the core shaft. The core shaft, in turn, together with all of the parts above described, is then finally anchored to the blade socket 105 of the hub 75 by the nut 111 and lock nut 112.

In lieu of a key for positively fixing the several propeller core shafts to their respective pinions 95 to assure operation in exact unison, I may use pins which project axially from the core shaft shoulder 114', as shown in Figures 7, 10a and 6. The pin 115 is primarily relied upon to locate the parts, while pins 114 provide supplemental torque transmitting strength.

The teeth 96 of the pinion 95 and the teeth of the racks 81 must be set in precisely the same position for all three blades, and this position is permanently held by the set-pin 115, so that all blades may be taken out and re-inserted and matched precisely at their standard pitch angle.

Intersecting the radial bores 108 for receiving the three blades are bores 81' in axial alignment with the propeller shaft and bored to precisely match said bores 108 to accomplish the precision setting between the pinions 95 and the racks 81, which reciprocate in the bores 81' and are connected with the pressure disk 80 by upsetting their reduced ends against the inner surface of the pressure disk about the holes in the pressure disk through which the reduced ends of the racks 81 extend (Figure 6).

At their forward ends 122 the racks 81 are connected for unitary movement by an annular plate 82 having apertures to receive the reduced and threaded forward ends of the racks 81. Nuts 123 securely clamp the annular plate 82 to the respective racks. The annular plate may be guided for sliding movement along the propeller nut 79 to which its central opening 83' may be fitted (Figure 1 and Figure 6). As the annular plate 82 moves outwardly along the propeller nut 79 it will encounter the pressure cap 84 which is urged rearwardly upon the nut by a powerful compression spring 86 seated in the nose cap 87 bolted to the hub. This spring aids in resisting thrust of the propeller blades in their extreme feathering position, and consequently assists in returning the blades from such extreme feathering position. The four holes 79' provided in the propeller nut are to facilitate the use of a lever for tightening the nut on its shaft, whereby to position the propeller hub snugly between the taper collars 77 and 78 which assure correct tracking of the blades.

Transmission casing T is shown in Figure 1 as attached to the nose section 71 of present day engines so that the propellers can be used for badly needed war production without delay, or waste of time for changes of present day equipment. The particular design of the parts shown to illustrate the application of the invention would obviously be quite different but for the desirability of making these parts adaptable to existing engine nose sections.

Figure 2 is shown without said nose section 71, and it is of course self-evident that said nose section can readily be built to accommodate the comparative simple transmission parts for operating this new controllable pitch propeller, as the few engine parts housed in said present day nose section readily fit my transmission parts as plainly as shown in Figure 1.

An important feature of my invention from a military standpoint lies in the fact that the very important and vulnerable electrical operating parts have been removed from the much exposed nose section, where previously known electrically operated propellers have had such parts. According to my invention, these parts are now placed in the cockpit where they are now under the constant observation of the aviator and a hand control is provided so that under fighting conditions where any of the control parts may be destroyed the aviator can keep flying by using the hand control and this enables him to make a safe landing.

My improved transmission T comprises a band 73 applicable by means of screws 74 to the existing nose section 71 of the plane. As best shown in Figure 2, this casing provides bearings at 99 and 100 for the upper and lower shafts 94 which are connected by a gear train comprising intermediate gears 135 and 136, which are respectively mounted upon the shafts 94 so that such shafts turn in unison.

Each of the shafts 94 carries two pinions 93, the several pinions being properly located to mesh with four racks 92 connected to the non-rotative outer race 90 of a composite anti-friction bearing set through which motion is transmitted to the pressure disk 80 for actuating the blade feathering racks 81. The non-rotatable outer race 90 is further guided in its axial reciprocation by the rods 103 and 103' (Figure 1).

Because of the high speed rotation involved, I find it convenient to provide the anti-friction connection between the outer race 90 and the pressure plate 80 by means of rollers 126, each of which is provided with its own anti-friction bearing mounting upon the pressure plate 80 and is preferably engaged in the annular channel 130 provided by the outer race 90, as shown in Figure 18. Each roller 126 actually comprises the outer race of an individual ball bearing, the inner race of which is mounted on a trunnion 127 having its reduced ends 128 engaged in bores 128' in the pressure plate 80, and a complementary cage ring 129 (Figures 17 and 18). If desired, friction may be somewhat reduced by tapering the outer race of the roller 126 to fit a complementary taper at 131 in the channel 130 of the outer race or ring 90.

The composite anti-friction driving bearing in actual practice has an outer diameter of only 17¼ inches, but is adapted to carry an endwise thrust load of 4500 pounds, using twelve small ball bearing units 126. This requires only about one-fifth of the width of a more conventional ball bearing to carry the same thrust. Moreover, in the conventional ball bearing, balls 1½ inches in diameter would be required, and the breaking of any one of these would destroy the functioning of the propeller, whereas in the construction disclosed, if any one of the small rolling bearing sets is out of order its race will simply slide in the outer race 130 of my composite bearing without rendering the feathering mechanism inoperative.

In addition to the safety factor above noted, it may also be mentioned that in the space between existing nose casings and the hub location on existing propeller shafts there is no room for conventional ball bearing structures such as would use 1½ inch balls to transmit the necessary pressure. It is only by this special design of ball race as herein disclosed that I am able to provide the necessary transmission mechanism in the space available.

It will be apparent that by the arrangement described any rotation of shafts 94 is immediately translated by means of the pinions 93 and the racks 92 into an axial movement of the outer race 90, such axial movement being communicated through the bearing structure 126 to the pressure plate 80 and thence, by means of racks 81 and pinions 95, again translated into feathering rotation of the respective blades upon their respective axes. The mechanism described is extremely sturdy, simple, and effective, and the disposition of the cross shafts 94 is such that they may be fitted around the existing nose section of present day airplanes without interference with any of the existing structure. The only requirement is that transverse openings be bored into the existing nose casings 71 to receive these shafts and their bearings.

So sturdy a mechanism requires no protection but it may be enclosed for streamlining purposes and for dirt exclusion by a housing 160 (Figure 1).

The power for operating the actuating connections thus far described may be derived in a variety of ways. But I have chosen, for illustrative purposes, to show the power communicated to this mechanism by means of another rack 141 which extends from the pilot's compartment to mesh with a pinion 135 on a shaft 139 connected to one of the gears 135' in the gear train, which provides connection between shafts 94 (see Figures 1 and 2).

Thus, in my preferred organization, there are three stages of transmission, each involving rack and pinion. In the first the reciprocating motion of the rack 141, engaging pinion 135 is used to rotate shaft 139. In the second rack and pinion stage, the rotation of the shafts 94 (gear connected with shaft 139) is used to reciprocate the racks 92. This motion, communicated through the outer race 90 of the anti-friction bearings 126 to the rotative pressure plate 80, reciprocates the racks 81 in the third stage to effect feathering movement of the respective blades.

The hollow steel blade structure is provided to meet the needs of a sturdy pitch adjusting propeller with power and size adequate to serve large military and transport planes. The structure and its method of construction are adapted considerably to increase the rigidity and strength of the blades with particular reference to their ability to withstand combined torsional and centrifugal strains throughout the blades, but especially in the root section thereof. The various features of the blade and its method of manufacture are shown in Figures 3 to 16, inclusive, in addition to the partial disclosure in Figures 1 and 2.

Figure 3 shows the assembly of the root of the blade mounted in the bore 108 of the hub socket 105 as above described; the core shaft 161 has a taper 162 to conform with the tapering form of the spar 170. The spar practically forms a continuation of the shaft, being mounted thereon by plug welding 175' (see Figures 4, 5 and 13) through punched slots 174, 175 formed in the blank 176 of Figure 11, which is later shaped to comprise a complete spar as shown in Figures 10, 10a, 5 and 13. Figure 12 shows a half spar formed from the half blank 177 and used in the process of joining the two half blades 194, 195 by arc welding as shown in Figure 4, where the two half blades are held firmly in mutually insulated carriage clamps of an arc welding apparatus, each being especially prepared with circular sections 201 and respective blocks 203 fitting thereto, and being adjustable in slots 217' for the purpose of accurately setting the respective blade sections, all being adjusted to the common axial center 212, of which two are shown; namely section 4a' and 5a.

The respective adjustment of the latter is shown in dotted lines 204, 204. For repetition work at the same setting the bolt 207 is opened and the upper linked portion 211 is swung open as shown by arrow 208 for taking out a welded propeller and inserting two other half blades without changing the respective section blacks 203, 203. For clearness of presentation only one clamping carriage device is shown while another like clamping apparatus is mounted on the slide 198, being moved on the slide rails 179 mounted on the bed 198 for the purpose of accurately holding the two half sections for arc welding, for which object the blade edges 179 are somewhat extended so they can fuse during the application of the current on wires 209, 210.

The hollow spar has the further object of receiving the welding grit and the provision of having an open bore 163' in said core shaft and continuing from the root to the tip of the blade, is for the purpose of removing all loose grit after the arc welding. Thereafter I insert a suitable quick hardening paste or coating of tar or pitch-like substance for arresting remaining particles that could not be removed even by suitable power driven tools. This pitch coats the interior inaccessible surface where such grit may be lodged, thereby anchoring the grit against displacement. Furthermore, the hollow passage 178 of the spar is then packed with suitable felt or other packing 170' to fully arrest any particle from loosening or moving under the centrifugal force of the running propeller, for the purpose of permanently retaining absolute balance of it.

To facilitate application by arc welding into the two half blades, the core shaft 161 is also formed in halves and screw bolts 192 are provided to properly locate said halves in the welding apparatus and later said bolts 192 are used for clamping said halves permanently.

Figure 10 shows a spar die 187 with respective flat pitch line surfaces 190 as well as an enlarged cross section with a complete spar formed around said die and showing the joint 181. A chucking section 188 extends at the root section and centers 188' are applied at either end for properly operating said die in a suitable machine. An alternate procedure of securing the hollow blade form 227 to the spar 173 is by spot welding as shown in Figures 2, 3 and 16, and in said procedure the core shaft remains in one piece and the smaller bore 163' is first bored and then the larger one 163 is made, thereby leaving the inner shoulder 192', leaving stock to receive the bolts 192.

The plug welding 175', 174' may be done by arc welding. The two half blades, as well as the bottom seal 161' and the top seal 162' may be put on by spot welding. The welding apparatus shown in Figure 5 has the same circular sections 201 for setting the respective blocks 213, 219. However, they are preferably of brick or other fire resisting material as in this alternate procedure the joining of the half blades 194, 195 is reinforced by brazing in a brazing furnace, and while it is known that attempts have been made for filleting certain weldings by soldering with soft cuprous metal, such usage would not perform the function of uniting my two half blades into a solid unit and to stand the strain on the joint.

The sectional setting of the half blades in both procedures of welding is alike as shown in the setting of section 4b and 5b. Both of those shown, as well as the entire series required by the whole length of the blade (see Figure 7, sections a to h) have the same axial center 212, and the entire series is permanently adjusted in the respective apparatus and after finish welding of one blade the setting is opened by loosening the bolt 207 and the lock 214. Then, turning the lock outward in the direction of arrow 215, the entire section 211 of the apparatus is turned open in the direction of arrow 208 without disturbing the setting of the blocks 213, 219, and the finished blade is taken out and the next two half blades set in. It will be noted that in this apparatus the blade is on edge and is supported at the bottom with the wedges 215 while the top half is held in place by links 216, which supports are of course applied to all sections in order to definitely set the correct pitch of the blade before welding.

It will, of course, be understood that the clamping apparatus shown in Figure 5 is duplicated at intervals throughout the length of the blade so that all portions of the blade are rigidly supported in the proper position before welding or brazing are undertaken.

When the brazing material in the form of wires 224 is set in place as shown in Figure 5, the structure is suitably heated to brazing temperature for the purpose of permanently brazing the two half blades together, as shown in Figure 14, which especially shows the root section of the blade with the fillers 169 in proper position to finish said root section. Said fillers are for the purpose of giving the root section of the blade greater strength, to increase the thrust of this section, as well as to help in the cooling of the engine; a further great advantage is to reduce the strain on the sheet steel in suitably forming the blade (see Figure 8, showing the blank 180 for a half blade and in dotted lines the section 183, 184 which will form the leading edge as well as the trailing edge for each respective blade).

As indicated in Figure 8, the blade blank is wide clear to its shank portion. This requires the use of fillers 169, but involves far less distortion of the blank than would be required to reduce it to a small root diameter. Moreover, the broad face of the blade continuing clear to its root is of great assistance in propulsion and in cooling the engine which drives the propeller. The lack of distortion resulting from choice of the blank form indicated in Figure 8 makes it possible to extend the blade to any desired length, such as would not be possible to achieve with more conventional blank contours.

This advantage is further increased by split curving the tip of the blade and forming the camber face 182 so that in the folding process it will strike the pressure face 185 in such a manner that suitable spot welding 182' will finish the tip as shown in Figure 9. This view also shows the folded sections 183' and 184' as perspective cross sections, which also show the shaping and suitable mounting of the half spar 178 by suitable spot welding 178' in the preparation of the half blades for arc welding them together as shown in Fig. 15. Figure 15 shows the finished arc welding joint 179, as well as the fillers 169 and the spot welding finish 180', 161', and furthermore illustrates the strong root section of the core shaft 161 with its bore 163. Said combination of parts is further brought out in Figure 16.

The control apparatus as shown in Figures 1, 2, 19 and 20 has its motive parts removed from exposed parts of the propeller itself, and its motor M, the worm drive W, and its main rack and pinion transmission R are placed in the cockpit, and preferably on the starboard side and at the rear of the navigator's seat, thus avoiding many of the dangers of the exposed parts of known controls being destroyed under fighting conditions and in accidents.

A suitable quick reversing motor M has an extended bearing 256 and the pinion 257 is mounted on the motor shaft 258' driving the considerably larger spur gear 253 mounted on shaft 259' running in suitable bearings 259 and carrying the large worm W firmly keyed to said shaft and driving the large worm wheel W' keyed to the shaft 147 and running in bearings 147' and terminating at its top in a reduced section 147" on which is mounted the contact pointer 148. At the bottom the pinion 145 is keyed to said shaft 147, and the connecting bearings 146 receive the heavy rack 144 held in sliding contact with said pinion 145 to receive longitudinal motion. The front part of the rack slides in bearing bracket 143 which has its rear end suitably mounted to the engine casing or its mounting parts and its forward end extending aside the nose section 71 of the engine.

While it is broadly immaterial how this bracket is supported at its forward end, it may be carried directly on the shaft 139, which is provided with pinion 135 actuated by the rack 141 reciprocable in bracket 143, whereby motion of the rack is transmitted through the pinion to the shaft 139 and thence to operate the transmission gears 135', 136, as previously described, for feathering adjustment of the propeller blades.

Driving connection to transmission casing T, see Figures 1, 2, 19 and 20, may be made from differing angles to best suit the construction of the particular airplane and its cockpit arrangements, as the transmission casing T has a circular flange 73 which may be adjusted to locate the point of power input at any desired side of the nose casting 71 of the plane. For example, Figure 1 shows the power input point located laterally adjacent the casting, whereas Figure 19 diagrammatically indicates the power input as being disposed above the nose casting of the plane. It will likewise be apparent that by extending shaft 139 or providing a similar parallel shaft operated by the rack 141, a single such rack may be used to deliver power for the simultaneous feathering of the blades of any number of propeller sets operated by different engines.

It will likewise be apparent that it is broadly immaterial to the propeller and its control mechanism what kind of motive power or regulating means is applied to the shaft 139 or its equivalent for operating the rack systems which accomplish the feathering of the propeller blades. If the rack 141 is used it may be actuated manually, hydraulically, or by means of a motor. All three of these means of operation are shown, incidentally, in the disclosure of a preferred system of electrical controls.

The manual control is simplest, and is available at all times regardless of what kind of control may be used.

The motor M on its forward extending shaft 258'' carries a face coupling collar, and its teeth 263 match the teeth 261 of the hub section 260' of the handle 260. Said handle is normally kept out of engagement by the fork 265 in which said handle is firmly held by ledge 269 riveted to spring 268 and fitting in notch of hub 265 (see Figure 20). Said fork 264 turns on stud 264' firmly mounted in base 266 so when said handle is needed either for testing operations or for emergency use while flying, the fork, after releasing the grip of spring 268, is given a quarter turn, as shown in dotted position 271 in Figure 20, when its ledge 269 snaps into the notch 270 and thereby fully releases said handle 260 for hand operation and after engaging the face coupling 261, 263' the propeller can be operated for feathering or unfeathering action in full flight of the airplane regardless of any damage which may have disrupted the automatic feathering operation by motor M. (In fact, even after the entire electric power service is destroyed.)

The electric controls (Figures 19 to 26), are of several coordinated types, providing for automatic governor actuation, manual operation, and semi-automatic operation. They are adapted either for single propeller control, or, by simply providing additional connections they are adapted for multi-propeller control.

Referring first to Figure 19, it will be noted that the selector switch S includes a casing 229 in which a selector disk 230 is mounted for oscillation by handle 230'. The casing carries supply contacts 4'' and 9'' which receive current by wires 40' and 40'' from the battery 50. When the safety switch 49 is closed, the contacts 4'' and 9'' are energized to communicate current to any of the moving contacts carried by the selector disk 230 which may be registered therewith in the oscillation of the disk.

The disk carries two arcuate series of contacts at different radii corresponding to the radial positions of contacts 9'' and 4'' on the casing. The outer series of contacts has been given even numbered reference characters from 2 to 14, and for convenient reference is referred to hereinafter as the feathering circuit series. The inner series of contacts has been given uneven numbered reference characters from 1 to 13, hereinafter called the unfeathering circuit series. For convenient reference the same characters are used to indicate the correspondingly connected contacts of other switch mechanisms, not only through Figure 19 but in all of the other alternative arrangements.

Above the worm wheel bearing 147' is located a stationary contact disk 245 having contacts bearing reference characters from 1 to 14, connected by suitable wiring in a cable 69 with the contacts of like number in the manually operable switch S. The shaft 147 which turns in bearing 147' extends through the stationary contact disk 245 and carries a moving contact arm 148 having a moving contact 18 registerable with the contacts 1—14 mounted in the plate.

The function of the switch S is to determine the limits within which the feathering movement of the propeller blades may be adjusted, either automatically or manually. The limitation may be purely electrical, or the movement of the contact arm 148 may, by closing appropriate circuits through the contacts on the disk 245, give a visible or audible signal which will guide the pilot by indicating that the desired limit established by switch S has been reached.

Switch S determines these limits through manipulation of its lever 230' which causes the various contacts to register in pairs with the live contacts 4'', 9''. In each such pair the even numbered contacts of the feathering circuit will establish the top limit of the feathering movement by energizing the corresponding even numbered contact on the stationary contact disk 245, while the odd numbered contacts of switch S, when energized, will energize the correspondingly numbered odd numbered contacts of the stationary contact disk 245 to determine the lower limit in an unfeathering direction of propeller blade adjustment. As the driving motor M is operated, whether manually, automatically, or semi-automatically, to effect a blade feathering movement of rack 141, the transmission of motion to the rack will involve rotation of shaft 147, thereby moving the pointer 148 over the face of the disk and bringing the pointer contact 18 into registry with the several stationary contacts carried by such disk. When the pointer contact 18 reaches the highest numbered contact of the feathering circuit (this being the contact 9 in the wiring diagrams illustrated) the energizing of contact 9 will break or reverse the circuit to the motor M, thereby precluding further feathering movement of motor M.

Similarly, when the pointer contact 18 touches the lowest numbered contact in the unfeathering circuit, this being the contact 4 which is shown energized in the particular examples illustrated, this will represent the lowest limit of movement of the blades in an unfeathering direction, and the motor M will be either de-energized or reversed to prevent further unfeathering movement (in either case a signal may be energized to indicate the respective limits without actually arresting motor movement or reversing it, if desired).

By shifting the hand lever 230' of switch S, different pairs of contacts may be energized, as clearly indicated in Figure 19. Thus, contacts 8 and 11 may be registered with stationary contacts 4'' and 9'', or contacts 2 and 3 may be registered with stationary contacts 4'' and 9''. Thus the pilot may establish for himself the particular limits which he wishes to be observed under any given conditions.

The governor G (Figures 19 and 20) has the important advantage that its operation involves very little frictional resistance, being electrical in operation. As illustrated in Figure 19, the governor casing is divided into two parts, the lower section 272 containing the rotating parts connected to the engine by bevel pinion 275, such pinion operating shaft 274 running in bearing 273 and carrying disk 276.

On such disks the lugs 277 pivotally support the weighted bell cranks 279 on fulcrums at 278. The inwardly projecting arms of the respective bell cranks bear on the outer race of a ball bearing 286 which turns freely with the bell cranks as the parts rotate. The heel 277 of each bell crank strikes the disk 276 to limit the outward throw of the weights and to preclude them from striking the casing. In the upper section of the governor the electrical contact parts are located, and moving parts have endwise axial motion substantially free from friction and from the difficulties encountered in attempts to provide governor control of hydraulic systems.

A tubular member 284 to which the inner race of bearing 283 is connected is vertically slidable upon a guide rod 274 which is adjustable in the upper section of the governor casing and has at its lower end a head limiting the downward movement of the governor responsive tubular member 284. At its upper end the member 284 has a wedge-shaped point 285 which bears upon the bifurcated lever 287. This lever is pivoted at 288 to the casing and is provided with a saddle engaged at 292 which is urged downwardly by a compression spring 295 adjustably seated in the screw plug 294, such plug being threaded into the casing and fixed by a plug nut 297 in any desired position of adjustment.

At its free end the bifurcated lever 287 carries a contact 36d which moves operatively across a terminal head 301, having at least two stationary contacts 4a and 9a. The moving contactor 36d is energized by a suitable current connection to the battery 50. The stationary contact 4a is connected to the motor terminal 33' which energizes the motor for operation in a direction to decrease propeller blade pitch while the stationary contact 9a is connected to the motor terminal 32', whereby the motor is energized for operation in a direction to increase propeller blade pitch. In operation, any increase in motor speed will be communicated through the bevel gear 275 to the governor weights, thereby causing such weights to swing outwardly against the compression of the adjustable spring 295, thus raising the sleeves 284 and moving contactor 36d into engagement with contact 9a, thereby causing the motor to function to increase propeller blade pitch. The increased pitch increases the load to which the motor is subject, thereby tending to slow the motor down. The motor M will continue to function in the direction of increasing blade pitch until the increased load accomplishes the result of slowing the motor down, whereupon the governor will respond to the decreased motor speed by allowing the governor weights to swing inwardly in response to the pressure of spring 295 and the moving contactor 36d will move out of engagement with contact 9a, thus de-energizing the motor.

When the engine speed drops below a predetermined point, the contactor 36d will engage contact 4a and will remain in engagement with such contact for a period sufficient so that the operation of the motor energized by engagement of such contacts will decrease propeller blade pitch until the propeller load is decreased sufficiently so that the engine will resume normal speed, whereupon the shifting in the position of the governor weights will break the engagement of contactor 36a with contact 4a, thus deenergizing the motor.

Connections to the rotary switch having contact lever 148 operated by the rack which shifts the propeller blade pitch may be made as indicated in Figure 19 to enable such switch to function as a limiting switch to limit the extent of motor energization in either direction in response to governor movement.

Figure 20 shows a modified driving arrangement and hookup including an alternatively usable form of governor, and further including a desirably usable feathering indicator for visually showing to the pilot at all times the exact pitch of his blades, the indicator being usable with any of the various systems herein disclosed. Figure 20 is partially a mechanical view of the parts involved and partially a diagram, some of the parts illustrated mechanically being also illustrated diagrammatically in order to show their electrical connections.

The governor is provided with a shaft 376 to which pinion 377 is connected to receive motion from the airplane engine. In the rotation of such shaft the weights 373 are moved outwardly upon their toggle lever system 370, 370', 371, 371' against the tension of the connecting spring 423, in the usual manner. The outward and inward movement of the weights is communicated through a swivel head 368 to a screw 408, which is thereupon moved upwardly and downwardly in a guide sleeve to oscillate the nut 409 which serves as an actuator for the movable contactor of a special switch presently to be described.

The governor switch comprises lower and upper dielectric terminal heads 350 and 351, which are identical in their arrangement of contacts, the lower series of contacts in the terminal head 350 being feathering contacts and the upper series of contacts in terminal head 351 being unfeathering contacts. Typical contacts used for feathering are marked 40m and 40n, both in the cross sectional view and in the corresponding diagram. Typical unfeathering contacts are marked 40p and 40q in terminal head 351, as illustrated both in the cross sectional view and in the diagrammatic view in Figure 20.

It will be noted that in each terminal head there is provision for a relatively large number of contacts. In actual practice some 24 contacts may conveniently be used. Alternate contacts are connected to different wires. Thus the contact 40q is connected to the lead 40c, while the contact 40p is connected to electrical lead 40d, alternate contacts being likewise connected to opposite electrical leads so that no two consecutive contacts are connected to the same electrical lead.

The contacts in the lower terminal head 350 are similarly arranged, contact 40n being connected to electrical lead 40b, while contact 40m is connected to electrical lead 40a. Throughout the series of contacts in this terminal head the alternate contacts are connected to different electrical leads, no two consecutive contacts being connected to the same electrical lead.

Between the two terminal heads operates a contact carrier serving both terminal heads alternatively according to its direction of oscillation with the nut 409. The carrier and contact arrangement are illustrated in detail in Figures 23, 25, which, although showing a different type of governor, use the same contacting switch. In each case there is a lever arm 380 projecting radially from the nut 409, at the end of which a screw 355 holds a rocker 354 oscillatably about the screw, and having a rocker arm carrying a double ended contactor 356, the length of which is not quite equal to the spacing between the terminal heads so that the contactor 356 may be engaged with either series of contacts in the respective terminal heads according to whether it is raised or lowered about the screw 355 as a pivot or fulcrum point.

Depending from the rocker 354 is a ball-headed lever 360 socketed in a drag disk 364, which is frictionally engaged with the surface of a braking member 365, offering only sufficient resistance to the rotation of the drag disk 364 so that as the nut 409 oscillates the contactor assembly in one direction or the other upon the terminal heads the drag of the disk 364 acting through the ball-headed lever 360 will oscillate the contactor 356 to engage either the upper or the lower series of contacts in the respective terminal heads.

Thus, as the engine accelerates to move the governor weights 373 outwardly, such weights, pulling downwardly on the screw 408, will oscillate the nut 409 to rotate the contact assembly counter-clockwise as indicated by the arrow 413 in the diagrammatic illustration of the governor switch in Figure 20. In the course of such movement the ball-headed lever 360 will communicate motion to the drag disk 364, the resistance of which will oscillate the contact carrier 354 in such a way as to positively engage the contactor 356 with the contacts 40m, 40n of the lower series in terminal head 350. The supply wire 36 from a source of electrical energy, here illustrated as a battery 50, is connected to the moving contactor as shown in Figure 20, so that the engagement of the contactor with the successive contacts of terminal head 350 will selectively energize such contacts in sequence. This, through mechanism presently to be described, will energize the motor M to increase propeller blade pitch in successive increments, each energization of a particular contact accounting for a specific increment of advance of the propeller blade pitch.

The connection of the motor M through pinion 257, gear 249, worm W and worm gear W' to the shaft 147, whose pinion 145 actuates rack 144, has already been described in connection with Figure 19 and is identical to the arrangement there illustrated. Coaxial with the shaft 147 is a motor control switch which, in many respects, is similar to the governor switch just described. The motor control switch is illustrated mechanically in side elevation in Figure 20 and is also shown schematically in plan, to illustrate its wiring connection. It includes an upper terminal head 353 and a lower terminal head 352, each having a series of contacts corresponding to the contacts in like series in the terminal heads 350 and 351 of the governor switch. The typical contacts in the series mounted in the upper terminal head 353 are designated 40s and 40t, while typical contacts in the series mounted in the lower terminal head 352 are designated with reference characters 40r and 40q.

As in the case of the governor switch, alternate contacts are connected to different wiring leads, the contact 40q, and other contacts similarly situated, being connected to wiring lead 40e. Contact 40r, and other contacts similarly situated, are connected to wiring lead 40f. The outer wiring lead 40e of the lower terminal head 352 of the motor operated switch is connected to the wiring lead 40b of the outer lower terminal head of the governor operated switch, while the inner wiring lead 40f of the motor operated switch is connected to the inner wiring lead 40a of the governor operated switch.

Similarly, in the cases of the upper terminal heads of the respective switches, the outer wiring lead 40g of the motor operated switch is connected to the outer wiring lead 40c of the governor operated switch, and the inner wiring lead 40h of the motor operated switch is connected to the inner wiring lead 40d of the governor operated switch. Thus the corresponding contacts in both terminal heads of the governor switch are connected to the similarly situated contacts in both terminal heads of the motor operated switch.

In the motor operated switch, however, there are two separate contactors individual to the respective terminal heads so that the motor operated switch is actually two separate switches. Contactor 416, which successively engages the fixed contacts of the lower terminal head 352 of the motor switches has a wiring lead 36b for operating the motor M in a feathering (pitch increasing) direction.

The upper contactor 411, successively engageable with the contacts of the upper terminal head 353, is provided with a wiring lead 36a which energizes the motor M to actuate the blade adjusting mechanism in a direction to unfeather or decrease the pitch.

Since the power requirements of the motor M will normally be greater than should be handled by the brushes of moving contactors 356 of the governor switch and 411 and 416 of the motor operated switch, I prefer to operate the motor directly from the power source 50 through relays controlled by the wiring leads 36a and 36b, above described. This arrangement is therefore illustrated in Figure 20.

The wiring lead 36a from the feathering contactor 416 of the motor driven switch mechanism is connected through the relay coil 425 to the negative side of the battery 50, which, for the purposes of illustration, serves as a power source. When energized, the coil 425 attracts the relay armature 426 to move leftward from its normally centered position, the pair of relay contacts comprising the movable contacts 427 and 428, these being directly connected with the power source, contact 427 being negative and contact 428 positive. In the course of their leftward movement these contacts respectively engage the stationary relay contacts 429 and 430 to energize the motor terminals 431 with positive current and 432 with negative current from the power source. At all times when switch 49 is closed the field coil 433 of the motor is energized.

When the moving contactor or brush 416 moves onto a dead contact, thus deenergizing the electrical lead 36a and the relay coil 425, the relay contacts 427 and 428 will move back to their normal central position, toward which they are biased, thereby opening the circuit to the motor brushes.

When the feathering contactor 411 of the motor driven switch engages a contact which is energized by the governor switch, current will be communicated through the electrical lead 36b to the relay coil 435, thereby attracting to the right as viewed in Figure 20 the relay armature 426, and thereby engaging the movable relay contacts 427 and 428 with the relay stationary contacts 430 and 436, respectively.

This will place the motor brush terminal 431 in direct connection with the negative battery terminal and the motor brush terminal 432 in direct connection with the positive battery terminal, whereby the motor is reversed and caused to operate in unfeathering direction.

The relay not only enables the use of a motor M which has greater power than could be energized directly through the governor and motor driven switches, but it also makes it possible to energize any number of motors M from such switches.

The operation by which the respective contacts of the motor driven switch are energized to operate (through the relay, if desired) the motor M in one direction or the other will now be described.

In operation, one terminal of the current source 50, being connected by means of conductor 36a to the contactor 356 of the governor switch, may be engaged either with the contacts of terminal head 350 or the contacts of terminal 351, according to the direction in which the governor switch contactor is actuated by the governor weights in response to engine acceleration or deceleration.

If a contact (for example contact 40m), of the lower terminal head 350 is engaged in response to engine acceleration, the battery current will be communicated through such contact to the lead 40a, thereby energizing the corresponding lead 40e of the motor switch and the alternate contacts of which 40u is representative. The lower moving contactor 416 of the motor switch, being then engaged with one of the alternate contacts of which 40s is an example, will receive battery current therefrom and will communicate such current through the conductor 36 to the relay coil 425 to close a circuit from the negative battery terminal to the motor terminal 432 to actuate the motor in a propeller blade feathering direction. However, the same motor induced movement of the worm wheel W' which effects feathering adjustment of the propeller blades will also effect a movement of the contactors of the motor switch, thereby moving contactor 416 from engagement with a contact of the 40s group to engagement with one of the alternate contacts of the 40t group. Since the conductor 40f is not now energized from the governor switch, it will be apparent that the current supply to the motor will be broken and the motor will be brought to rest after but one increment of advance.

In actual practice this may amount to any desired number of degrees of blade feathering movement, but in the device shown approximately two degrees of blade feathering movement is accomplished. Any continued acceleration of the propeller actuating engine will produce a further response of the governor weights 313 and further response of the governor switch in the direction of the arrow 413 in the schematic illustration of such switch. This will move the contactor 356 from engagement with a contact of the 40m group to the next contact, this being a contact of the 40n group connected to conductor 40b. Conductor 40b will now be energized and will energize conductor 40f and the contacts of the 40r group in the motor operated switch. It will be recalled that in the last increment of advance of the motor and the blade feathering mechanism actuated thereby, the contactor 416 was moved into engagement with a contact of the 40r group. At that time the motor was brought to rest because conductor 40f was not energized. 40f being now energized by a further advance of the governor switch, the motor M will now be energized through conductor 36a, which will renew the motor operation in a blade feathering direction for a further single increment of advance. At the conclusion of such increment of advance contactor 416 of the motor operated switch will pass from engagement with a contact of the 40r group into engagement with the now deenergized alternate contact of the 40s group, thereby again bringing the motor to rest at the conclusion of such single increment of advance.

When the propeller actuating engine decelerates, thus permitting the governor weights 313 to move inwardly, a reverse operation occurs, in which the drag of the disk 364 shifts the contactor 356 of the governor switch into engagement with the contact series of the upper terminal head 351. The operation is identical to that already described except that each successive increment of motor operation occurs in a blade unfeathering direction, in which the angular settings of the propeller blades are progressively decreased. In every instance the same movement of the blade adjusting motor which accomplishes blade adjustment in response to the actuation of the governor switch will also effect a simultaneous movement of the motor operated switch to break the circuit at the conclusion of such increment of advance, and to establish a new circuit through which blade operating movement of the motor may be effected in either direction when further changes in the position of the governor switch occur in response to engine acceleration or deceleration.

If desired, a manual control for the motor M may be arranged for use alternatively with the automatic control as above described. This may be done very simply by providing the control lever C of the plane with a switch structure including at 43 a three-way switch connected in the line 36a of the governor switch, and also connected to the hand operated push button switches 44 and 45, the arrangement being such that in one position of switch 43 the push button switches 44 and 45 will be supplied with current, while in another position of the switch 43 the governor switch will be supplied with current.

If anything happens to the governor switch, or, if for any reason the pilot desires to take over the automatic control and adjust the propeller blade pitch to suit himself, he may do so by cutting off the governor switch to energize switches 44 and 45. Manually operable push button switch 44 is connected by a conductor 40i with relay coil 435, whereby the motor M is energized for unfeathering movement. Similarly switch 45 is connected by a conductor 40 with relay coil 425, whereby motor M is energized for feathering operations. When the hand operated switch is in use, the automatic control being entirely cut out, the motor M will operate in a feathering direction as long as the operator depresses the button of switch 45, and will operate in an unfeathering direction as long as the button of switch 44 is depressed.

In any of the constructions herein disclosed it is considered highly advantageous to employ a gage or meter for indicating precisely the pitch angle of the blade or blades subject to control. The rack bar 141' being directly connected with the mechanism for shifting the pitch position of the respective blades, it is conveniently possible to apply to such bar a separate rack 325 engaged with a pinion 321 on a shaft 322, which, extending through bearing 321, is connected by miter gearing at 326, 327 with an indicator shaft 329 carrying an indicating symbol or pointer 330 which may take the form of a chord section of the propeller blade.

The lower margin of the pointer or indicator 330, being substantially rectilinear, may represent the pressure face of such a blade, and it may be made to move across a suitable dial 333 bearing calibrations 334 in terms of degrees or otherwise, such calibrations indicating to the pilot at all times the exact position of his propeller blade or blades subject to the control. Obviously the calibrations may be in terms of degrees or may be in terms of arbitrary symbols indicating relative pitch.

In any of the devices herein disclosed it is desirable for accurate control that there should be no appreciable overrun of the motor M and its driven parts. At least the motor should be brought to rest in a predetermined interval after it is deenergized. This may conveniently be accomplished by a friction brake mechanism illustrated in Figure 22 applied to the motor driven gear 253. A brake disk 252 bearing against the face of the gear is engaged by pins 251 which hold such disk against rotation. A spider-shaped spring 254 is engaged at 249' by a lever 249 pivoted at 250 and subject to adjustable engagement at its end by an adjusting nut 248 or screw 256. The lock nut 248' will hold the nut 248 in any position to which it is set to apply exactly the desired friction to bring the parts to rest at a predetermined point following deenergization of the motor M.

It may be added parenthetically that the governor switch and the motor operated switch may differ in respect of the overlap of the moving contactor with respect to the stationary contacts. In the governor operated switch there should be no overlap. There should be a definite interval between the stationary contacts which is greater than the face of the contactor so that the contactor will definitely clear one contact before engaging another. In the case of the motor operated switch, however, it is important that the switch should never be left wholly open. As soon as the contactor clears one contact it must be positively engaged with another, and actual overlap is immaterial.

Figures 23, 24 and 26 illustrate a further modified form of governor having certain advantages. The engine driven shaft is indicated at 376, and the weights 373 are carried by a toggle lever set 370, 370', 371, 371' as described in connection with Figure 20. However, in this construction the toggle levers 370, 370' are connected through an anti-friction swivel bearing arrangement 368, 369, 370, 370' to a vertically movable rack bar 378 secured to the inner race of the anti-friction bearing by a nut 379. This rack bar has rack teeth at 382 meshing with a pinion 383 on cross shaft 384, such cross shaft being provided with another pinion at 388, driving gear 390 to operate the bevel gear 391. This bevel gear meshes with bevel gear 380 which is rotatably mounted on the outside of the stationary sleeve 383 through which the rack bar reciprocates, and in which the rack bar is non-rotatably keyed at 394.

The hub of gear 380 carries the arm upon which the rocker 354 carries the contactor 356, as previously described. The ball-headed lever 360 depending from the rocker engages the friction disk 364 which bears against a stationary friction element 365 (such as a piece of cork) which will provide the required coefficient of friction to resist movement of the disk only sufficiently to assure the oscillation of the rocker 354 according to whether the gear 380 is moved in a clockwise or a counter-clockwise direction.

A very sensitive adjustment is provided for this governor by means of the spring 386 which is wound, as clearly shown in Figures 23 and 24, upon a pulley 385 mounted on shaft 384. The end of the spring is secured at 387 to the pulley. After passing at least part way about the pulley the spring is carried out of the governor casing through an opening 410 to an anchorage which may be provided by a cord 419 wound upon a manually controllable pulley 420 adjustable on shaft 421 by means of a handle 422. The so-called booster lever or handle 422 may be adjusted by the pilot as desired to vary the tension of spring 386, thereby varying the relative position of the propeller blade pitch at any given engine speed.

As contrasted with ordinary governor springs, which are usually short and heavy, the greater elasticity and sensitivity of the elongated type of spring provided at 386 gives a much more sensitive and even control.

It will, of course, be understood that any desired governor may be used in the automatic control indicated, but it is believed that governors of the specific types disclosed have advantages making their use desirable.

Where it is desired to apply my feathering control mechanism to planes which are already provided with governors organized for the control of hydraulic servo-motors, I may connect such a servo-motor as indicated in Figure 21 directly to the rack bar 141 for the hydraulic operation thereof. I have shown the servo-motor 320 provided with two inlets as indicated by arrows 331 and 337 to the opposite ends of the cylinder in which piston 321 operates, such piston being connected to the end of the rack bar 141 by means of a nut 324' applied to the threaded end 324 of the rack bar. The piston may have suitable packing at 322. The respective inlet ports 335 and 332 at the opposite ends of the cylinder from the respective pressure lines are controlled by valve members 329 mounted on a spindle 330 to move as a slide valve in the valve casing 330'.

The placing of the valve members upon the spindle is such that when the valve is in one position, as indicated in Figure 21, the inlet port 332 to the outer face 323 of the piston is open, while the outlet port 334 is open from the other end of the cylinder. When the valve is shifted to the right from the position in which it is illustrated, it will close port 332 and port 334 and will open the inlet or pressure port 335 and the outlet or drain port 336, thus reversing the direction of piston operation. While it is broadly immaterial how the valve is actuated, its stem or actuating rod 328 may be moved either by hand or by connection to a suitable governor or any other desired manner.

It is important to lock the piston in each position of adjustment where hydraulic operation is employed. I accomplish this by providing rack teeth at 344 upon the rack bar 141, such teeth meshing with a pinion 343 on the shaft of an electromagnetic brake energized by connections indicated at 341 and 342, the arrangement being such that the brake is deenergized when the piston is being intentionally shifted to a different setting.

It is also of the greatest importance that provision be made for emergency operation. To this end the shaft on which pinion 343 is mounted is provided with a manually operable handle 345 serving the same purposes as the crank with which I am able to operate the armature shaft of the electric motors herein disclosed.

In the event of power failure or other accident, the pilot may control his blade pitch manually by rotating the crank 345, thereby manually actuating the rack 141. To permit such actuation notwithstanding the possible closed position of the valves controlling the ports from the hydraulic cylinder, I provide an emergency by-pass valve 339 which either drains the fluid from both ends of the cylinder or by-passes the pistons so as to permit of free piston movement in the cylinder during manual operation.

It will, of course, be understood by those skilled in the art that various changes and adaptations may be made in the features herein disclosed. The device as disclosed represents but one of various possibilities in the way of complete variable pitch propeller systems incorporating my invention. Where I have suggested limitations, these are merely by way of example, and they may be combined in various ways other than those specifically indicated.

In order to summarize the several features of the invention in the complete system illustrated, the following list of their advantages is briefly stated:

The hub design presents important advantages in that it is of unusual strength and of unusual simplicity. Unlike many variable pitch propeller structures, the hub for the propeller herein disclosed is unitary, and is preferably not only unitary but made in one single piece, requiring only the provision of the several bores and machined bearing surfaces herein described. It therefore has exceptional strength and offers a minimum of air resistance. It is made with a minimum of labor and material. Any number of blades may be mounted without any fundamental change in hub design.

The propeller blade has a great many advantages in the way of simplicity, economy of manufacture, lightness, strength and efficiency. The blade is unique in the manner of its internal reenforcement and the provision of a shaft mounted in such reenforcement to project from the root end of the blade for its mounting. It is also unique in the specific manner in which it is fabricated, being made of channel-shaped blade parts each comprising sheet metal folded upon a line representing the leading or trailing edge of the blade so that the union between the parts is made along the center line of the pressure and camber faces. The blade is also unique in the construction of its tip and its root portions. While particularly adapted for use in a variable pitch propeller, the blade is of such a character that it may be mounted in any hub for use in any type of propeller, variable pitch or otherwise, and its pitch adjustment may be controlled in any manner.

The method of blade manufacture is closely related to blade structure and makes possible the specific features of blade construction above noted. The method involves the particular manner in which the component parts of the blade are pre-fabricated and joined together, including not only the channel-shaped members which provide portions of the blade faces, but also the reenforcing or spar sections which are incorporated within the blade and serve to mount the stub shaft upon which the blade may be mounted in the hub. The method is also concerned with elimination of material unavoidably left by the welding or brazing operations in the interior of the blades. Such material must be either completely removed or completely fixed as to position, as otherwise it would, when dislodged, destroy the balance of the blade. The method of construction includes the removal of all such material as is loose, and the permanent fixation of the remainder, the packing used as a part of the fixation process being variable as to amount, whereby to assist in balancing the blades against each other.

The pitch varying mechanism is closely related in some respects to the hub design. The mechanism at the hub includes three racks, the bores in which the racks operate being the only openings in the hub other than the blade sockets and the mounting bore. The construction is such that the number of racks may readily be varied according to the number of blades to be operated, the operation in all instances being identical regardless of such number. The pressure plate which operates the several racks in guided upon a portion of the propeller hub and is moved by a highly novel swivel bearing organization, which includes rollers having anti-friction supports on the pressure plate and operating in an axially reciprocable race, whereby axial motion is communicated to the pressure plate during its rotation of the hub. The actuation of this race, in turn, is preferably likewise accomplished by racks moving axially of the propeller shaft at opposite sides thereof and activated by pinion shafts which are so organized and disposed as to permit of their installation in the very limited space available between the propeller and the nose of the plane in existing equipment. By using an indexible mount for these rack actuating pinion shafts and their intergearing I am able to carry my operating connections from the cabin of the plane to the mechanism at the nose of the plane at any desired point, and I locate all of the power or manual controls in the cabin where they can readily be protected, thus leaving no delicate electrical wiring or electrical controls at the vulnerable nose of the plane.

Electrical controls, preferably located as above indicated, in the cabin of the plane, meet almost any requirement in that I have shown arrangements for automatic control, for manual control, and for limiting the automatic control to function either in predetermined increments at each energization, and, if desired, to function over a predetermined range, within limits fixed by the operator. In order to effectuate my purpose in these regards I have provided novel types of switches having movable contactors or brushes which automatically shift from one series of fixed contacts to another according to the direction of movement of the part from which power is derived. I have also devised new circuit connections so that the circuit may in each instance be closed by the governor operated switch and opened at the end of a predetermined increment of travel by the motor operated switch to limit the propeller pitch adjustment to the desired increments without using a separate wire for every contact, such as might otherwise have been required. Regardless of whether the controls are electrical or hydraulic, I have provided means, normally ineffective, for operating the pitch adjusting mechanism by hand in the event of power failure or accident to the control mechanism.

The indicator is an extremely important feature for experienced pilots, as well as being of great assistance to those who are learning. Irrespective of the type of feathering propeller or the actuating mechanism therefor, or the controls, the indicator is provided with motion transmitting connections which cause its pointer to move in exact accordance with the pitch movement of the blades so that at all times the blade pitch is shown on the indicator dial. The indicator has particular utility in the combination disclosed, inasmuch as the mechanical actuating connections which adjust the blades as to pitch actually extend into (or from) the cabin of the plane, thereby facilitating the direct application of the indicator thereto.

Improved governors are an important feature of the invention and may be used for purposes other than the particular propeller system herein disclosed. Not only are the governors susceptible of separate use, but it will be understood that either of the governor mechanisms disclosed herein may be substituted for the other in the general organization.

The switches disclosed, and the circuit connections for such switch, are important for reasons previously indicated, and, like the governors, these switches may be used for purposes other than the purposes of the particular propeller control system which comprises the primary subject of the invention. The switches, however, have particular application to this propeller system, and the means whereby the moving contactor or brush of a governor switch may be made to engage selectively either the feathering contacts or the unfeathering contacts according to whether the governor is accelerated or decelerated is a feature of particular value. By energizing alternate contacts in sets and connecting the sets as such with similar alternate contact sets in the motor driven switches, I am able to cause the contactors of the motor driven switches to move in predetermined increments without separately wiring each individual contact of one switch to a corresponding individual contact of the other. Thereby I reduce the amount of wiring required and accomplish great simplification and reduction in cost of materials and labor. The resulting simplicity is also a great advantage when it comes to repair and freedom from injury during use.

I claim:

1. In an airplane propeller, the combination with a propeller shaft, of a hub mounted on said shaft and provided with outwardly opening blade sockets, blades rotatable upon their respective axes in the respective sockets and provided with pinions, racks slidable through said hub in general parallelism with said shaft and meshing with the respective pinions for the oscillation of the respective blades in their sockets, a pressure plate to which the several racks are connected behind the propeller, an annular member connecting the several racks forwardly of the propeller, and spring means biasing the several racks for movement rearwardly parallel to said shaft.

2. The device of claim 1, in which said biasing spring means includes a spring and a yieldable stop member acted upon by said spring and positioned to be engaged by the annular member connecting the racks at a point intermediate the rack range of movement, whereby said racks are free of bias during a part of their range of movement and are subject to bias during another part of such range of movement.

3. In a variable pitch propeller, the combination with a hub and a set of blades having shank portions journaled in the hub for pitch adjustment, pinions upon the respective blade shank portions, racks reciprocable axially of the hub and meshing with the respective pinions, a pressure plate connecting said racks, bearing means engaged with said plate and including a relatively non-rotatable annulus with which said plate is in bearing engagement to receive reciprocations from said annulus, a set of racks connected with said annulus, and means for reciprocating said last mentioned racks in unison, the means for reciprocating the last mentioned racks in unison comprising a pair of mutually spaced cross shafts extending transversely at opposite sides of the axis of the hub, pinions upon the cross shafts, motion transmitting means connecting the cross shafts for simultaneous rotation, and driving connections for said cross shafts and motion transmitting means.

4. In a device of the character described, the combination with a propeller shaft, of a propeller hub mounted on said shaft and provided with rack bores generally paralleling said shaft and with blade sockets intersecting said rack bores, blade shanks in the respective sockets provided with pinions at said rack bores, racks in the rack bores meshing with the blade pinions, an annular pressure plate connecting the respective racks immediately behind said hub, said pressure plate being rotatable with said hub and axially with said racks, a driving annulus for said pressure plate having peripheral bearing connection therewith, said annulus being reciprocable along the axis of said shaft and fixed against rotation, a set of racks distributed about said shaft and engaged with said annulus, cross shafts disposed at opposite sides of the propeller shaft and provided with pinions with which the racks last mentioned are in mesh, a gear train connecting said cross shafts for concurrent rotation, whereby simultaneously to advance and retract the last mentioned racks, thereby advancing and retracting said annulus and said pressure plate during pressure plate rotation, and driving connections for said cross shafts and gear train.

5. The device of claim 4, in which said driving connections include a driving shaft for the gear train provided with a pinion, a rack meshing with said pinion, and a remotely located motor having an operating part connected with said last mentioned rack for the reciprocation thereof.

6. In a device of the character described, the combination with a nose casing and a propeller shaft projecting therefrom, of a propeller hub on said shaft close to said casing and provided with a set of racks reciprocable parallel to said shaft to and from said casing, a pressure plate of annular form connecting said racks and disposed between said hub and said casing, blades mounted in the hub for pitch adjustment and provided with pinions meshing with the respective racks, an annular bearing race surrounding said pressure plate means for reciprocating said bearing race, and anti-friction bearing means connecting said bearing race with said pressure plate, whereby to transmit reciprocation to said pressure plate during rotation of the pressure plate respecting said race, the means for reciprocating the bearing race comprising cross shafts at opposite sides of the propeller shaft, motion transmitting connections between said cross shafts for assuring their rotation in unison, pinions carried by the cross shafts, and racks meshing with the respective pinions and connected with the bearing race at different points about said propeller shaft for the balanced reciprocation of said race.

EMIL R. LOCHMAN.

(References on following page)

REFERENCES CITED

The following references are of record in the file of this patent:

UNITED STATES PATENTS

| Number | Name | Date |
|---|---|---|
| 1,133,222 | Bevis | Mar. 23, 1915 |
| 1,329,473 | Peoples et al. | Feb. 3, 1920 |
| 1,380,057 | Gove | May 31, 1921 |
| 1,383,388 | Carter | July 5, 1921 |
| 1,415,412 | Shaver | May 9, 1922 |
| 1,666,441 | Craft et al. | Apr. 17, 1928 |
| 1,835,006 | Bolduc | Dec. 8, 1931 |
| 1,839,895 | Rossi | Jan. 5, 1932 |
| 1,857,392 | Nixon | May 10, 1932 |
| 1,908,893 | Edman | May 16, 1933 |
| 1,954,864 | Crafts | Apr. 17, 1934 |
| 2,010,640 | Michl | Aug. 6, 1935 |
| 2,020,366 | MacCallum | Nov. 12, 1935 |
| 2,030,629 | Gorski | Feb. 11, 1936 |
| 2,044,607 | Garrett | June 16, 1936 |
| 2,084,655 | Roberts | June 22, 1937 |
| 2,086,772 | La Salle | July 13, 1937 |
| 2,127,687 | Heath | Aug. 23, 1938 |
| 2,147,078 | Barish | Feb. 14, 1939 |
| 2,220,996 | Feigel | Nov. 12, 1940 |
| 2,228,776 | Mullen | Jan. 14, 1941 |
| 2,229,058 | Dicks | Jan. 21, 1941 |
| 2,233,364 | Gemeny | Feb. 25, 1941 |
| 2,280,374 | Chilton | Apr. 21, 1942 |
| 2,327,217 | Reiber et al. | Aug. 17, 1943 |
| 2,360,982 | Sahle | Oct. 24, 1944 |
| 2,364,672 | Stevenson | Dec. 12, 1944 |